(No Model.)
C. SCHIRRMEISTER.
MECHANICAL MOVEMENT.
No. 345,077. Patented July 6, 1886.
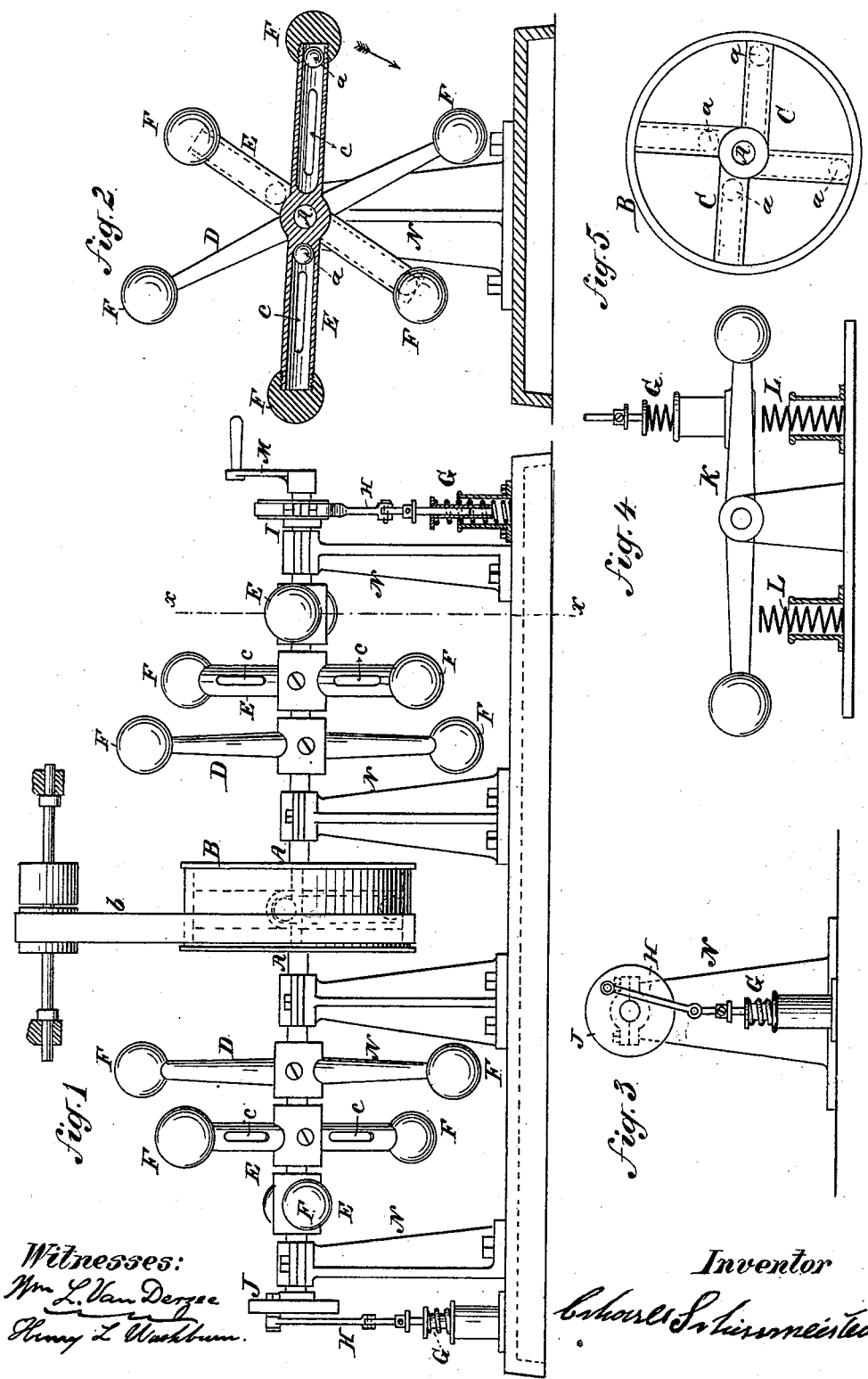

UNITED STATES PATENT OFFICE.

CHARLES SCHIRRMEISTER, OF BROOKLYN, NEW YORK.

MECHANICAL MOVEMENT.

SPECIFICATION forming part of Letters Patent No. 345,077, dated July 6, 1886.

Application filed June 13, 1884. Serial No. 134,800. (No model.)

*To all whom it may concern:*

Be it known that I, CHARLES SCHIRRMEISTER, a citizen of the United States, residing in Brooklyn, in the county of Kings and State of New York, have invented a new and useful Mechanical Movement, of which the following is a specification.

The object of my invention is to furnish a cheap and simple means for imparting mechanical power; and I accomplish this by means of a series of radial arms placed at right angles to and projecting from the axis of motion where power is first applied, and so arranged that each arm is in a different vertical plane, said arms being weighted at each end with a ball of metal. Some of these arms are also made hollow and inclose sliding or rolling weights, which move back and forth as the axis revolves, and the motion is still further re-enforced by a series of springs which are attached to the axis by a lever and eccentric.

Taking the simplest form of my device, I illustrate the same by the accompanying drawings, in which—

Figure 1 is a side elevation of the entire apparatus. Fig. 2 is a sectional view showing the hollow arm with a rolling weight. Fig. 3 is an end view showing the operation of a re-enforcing spiral spring. Fig. 4 is a detailed view showing still further the method of re-enforcing motion by springs. Fig. 5 is a view of the driving-pulley with its hollow arms.

Similar letters refer to similar parts in the several views.

A is the axis to which the power first imparting motion is applied.

N are the bearings supporting the same.

B is the driving-pulley attached to said axis, and from which motion is imparted by means of the driving-belt *b* to any point desired.

C are the hollow arms of the driving-pulley B.

D are the solid arms radiating from the axis A.

E are the hollow arms radiating from the axis A.

F are the solid balls or weights secured to the ends of the arms D and E.

*a* are the sliding or rolling weights, which are inclosed within the hollow arms C and E.

*c* are the slots cut into the hollow arms E, to relieve the air-pressure formed by the backward and forward motion of the weights *a*.

G are springs so arranged as to expend their force upon the axis A by means of the connecting-rods H, both attached to the springs, and one attached to the axis A by means of the eccentric I and the other to the wheel J at one end of the axis.

K is a balanced lever, upon which the springs G may rest, said lever being supported at each end upon the springs L.

M is a crank attached to one end of the axis A, and serves to show the place and manner in which the power may be applied.

The manner of constructing and operating my invention is as follows: The entire apparatus is made of steel or iron, and the shaft, bearings, arms, springs, and connecting-rods are of ordinary form. The main or driving pulley is cast with four hollow arms, in which round weights are inclosed, which move back and forth within the arms when the wheel is set in motion. The solid arms, as well as the hollow arms, which are used in addition to those forming a part of the driving-pulley, are arranged by means of set-screws a suitable distance apart upon the axis and in different perpendicular planes, so as to give steadiness in motion. A thread is cut upon each end of these arms, and the fixed weights are then screwed on. When the shaft or axis revolves, the weights which move toward the ends of the arms above the center accelerate the motion, and the momentum of the machine aids in overcoming the resistance caused by the weights, which are below the center. At the same time the revolution of the eccentric and crank-pin upon the axis depresses the connecting-rods, which in turn depress the springs, which, being released as soon as the eccentric and crank-pin have reached their lowest point, contribute a lifting power to overcome the resistance above mentioned. As shown in the drawings, these springs joined to the connecting-rods may be supported and assisted by other springs.

The power is applied by hand, operating upon a crank at the end of the axis, or may be imparted by steam, hot air, electricity, or in any other known method, and is conducted to any desired point by means of the belt *b*.

Having fully described my invention, what I claim as new, and desire to secure by Letters Patent, is—

1. The combination, in apparatus for increasing mechanical power, of an axis, as A, supported upon bearings N, with a driving-pulley, as B, having hollow arms, as C, with movable weights, as a, and radial arms, both solid and hollow, the latter having movable weights, together with fixed weights attached to the end of each arm, all substantially as and for the purpose described.

2. The axis A, supported upon the bearings N, in combination with the driving-pulley B, having radial hollow arms C, with movable weights a, and also hollow arms E, with the slots c, fixed weights F, movable weights a, and solid radial arms having weights F, all substantially as described, and for the purposes specified.

3. The axis A, bearings N, driving-pulley B, with hollow arms C, solid arms D, hollow arms E, fixed weights F, and movable weights a, in combination with the eccentric I, end wheel, J, connecting-rods H, and springs G, as and for the purposes described.

4. The axis A, bearings N, driving-pulley B, with hollow arms C, solid arms D, hollow arms E, having slots c, fixed weights F, movable weights a, eccentric I, and wheel J, connecting-rods H, crank M, and springs G, in combination with the balanced lever K and the springs L, all substantially as described, and for the purposes specified.

CHARLES SCHIRRMEISTER.

Witnesses:
HENRY L. WASHBURN,
WM. L. VAN DERZEE.